United States Patent [19]

Eichenbaum et al.

[11] 4,289,558
[45] Sep. 15, 1981

[54] METHODS OF AND APPARATUS FOR ORGANIZING FIBER LIGHTGUIDES INTO A PLANAR ARRAY

[75] Inventors: Bernard R. Eichenbaum; Francis J. Topolski, both of Lilburn, Ga.

[73] Assignees: Western Electric Company, Inc., New York, N.Y.; Bell Telephone Laboratories, Murray Hill, N.J.

[21] Appl. No.: 921,625

[22] Filed: Jun. 30, 1978

[51] Int. Cl.³ .............................................. B32B 5/00
[52] U.S. Cl. .................................. 156/179; 156/180; 156/436; 156/441; 226/196; 242/18 G
[58] Field of Search ................ 156/180, 181, 178, 179, 156/436, 441, 516; 65/4 B, 4 A; 350/96.1, 96.3; 174/117 F; 226/196, 4; 227/119; 264/1; 214/10.5 R; 427/162, 165; 242/18 G, 42, 157 R

[56] References Cited

U.S. PATENT DOCUMENTS

| | | |
|---|---|---|
| 2,373,078 | 4/1945 | Kleist . |
| 3,046,170 | 7/1962 | Toulmin, Jr. . |
| 3,130,453 | 4/1964 | Haigler, Jr. ............................. 19/65 |
| 3,390,039 | 6/1968 | Caughman et al. ................... 156/166 |
| 3,695,977 | 10/1972 | Kandelaki et al. ................... 156/441 |
| 3,743,560 | 7/1973 | Western ............................... 156/181 |
| 3,809,514 | 5/1974 | Nunez ................................. 425/112 |
| 3,819,442 | 6/1974 | Brushenko ........................... 156/180 |
| 3,920,432 | 11/1975 | Smith .................................... 65/4 B |
| 4,029,390 | 6/1977 | Chinnock et al. ................... 156/158 |
| 4,057,448 | 11/1977 | Miller .................................. 156/158 |
| 4,078,853 | 3/1978 | Kempf et al. ...................... 350/96.23 |
| 4,096,010 | 6/1978 | Parham et al. ...................... 156/179 |
| 4,129,468 | 12/1978 | Knab ................................... 156/148 |

OTHER PUBLICATIONS

Dalgleish, J. F. "A Review of Optical Fiber Connection Technology", pp. 25-27 & 30-31, *Telephony*, Jan. 31, 1977.

*Primary Examiner*—Stanley S. Silverman
*Attorney, Agent, or Firm*—E. W. Somers

[57] ABSTRACT

In order to organize a plurality of fiber lightguides (33—33) into a planar array (40), so that they can be bonded together between two tapes (34—34) to form a ribbon (32), the fiber lightguides are payed out from individual supply spools (51—51) and advanced toward a takeup (43). Interposed between the supply spools and the takeup is at least one surface (72) past which the lightguides are advanced and which is effective to organize them contiguously into a single layer array (76). The surface is made with a curvature which is convex in the direction of advance of the fiber lightguides and which is concave in a direction transverse to the direction of advance. The single layer array (76) is advanced past and in engagement with another surface (86) which reforms the array into a planar configuration after which the lightguides are bonded together to form the ribbon (32). A plurality of the ribbons may be formed into a stack which comprises a core (31) of an optical communication cable and which lends itself to group-splicing techniques.

10 Claims, 12 Drawing Figures

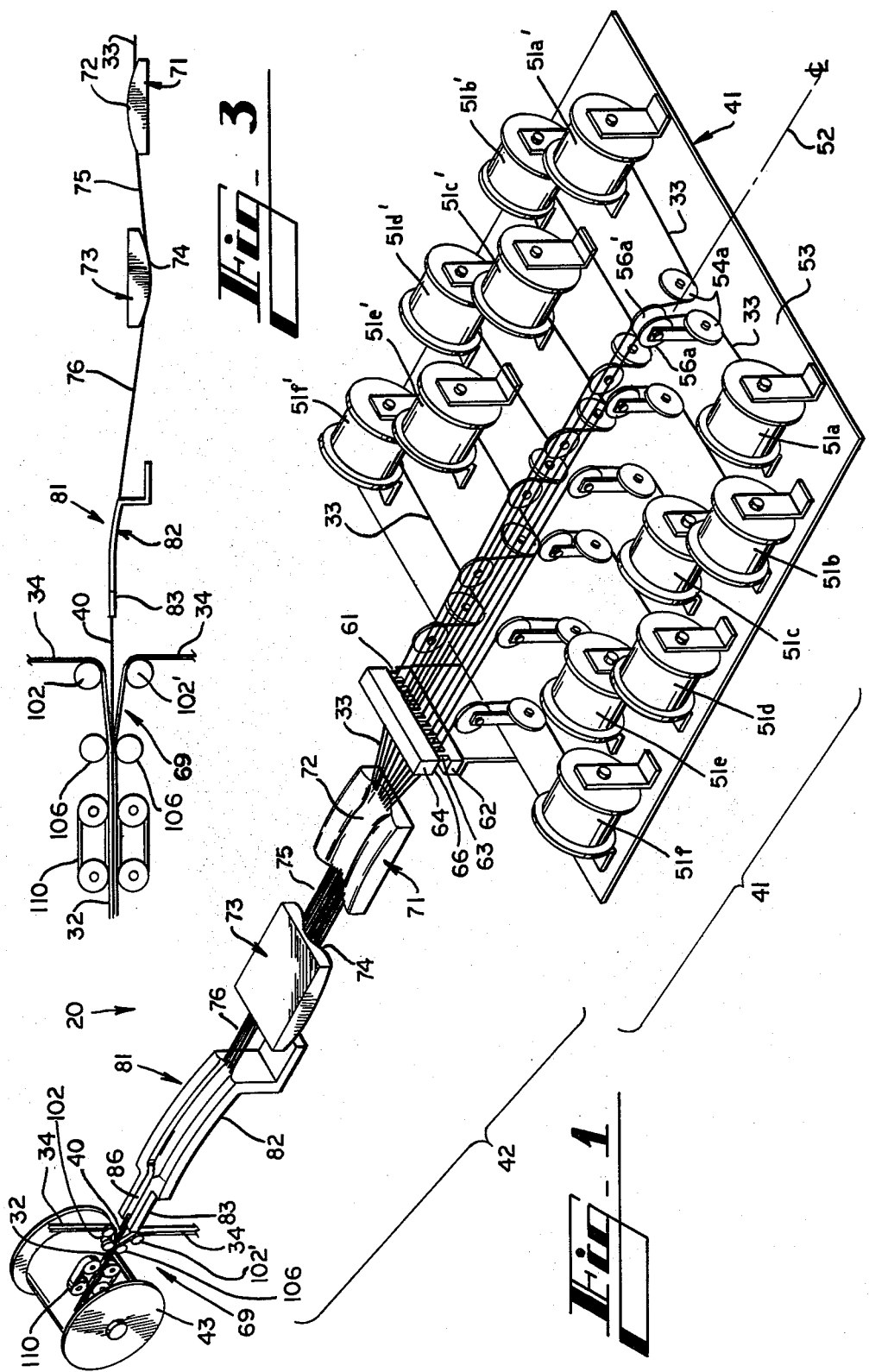

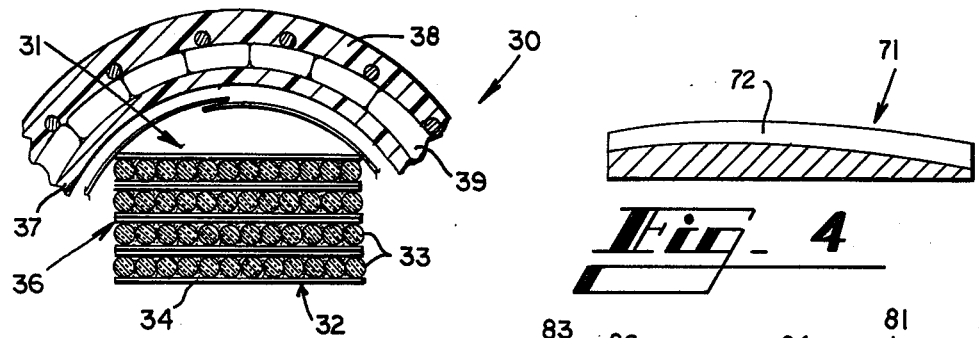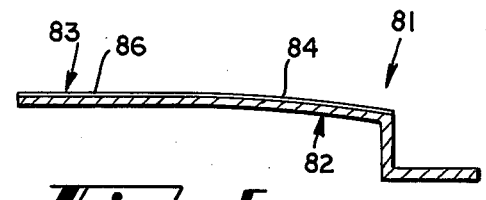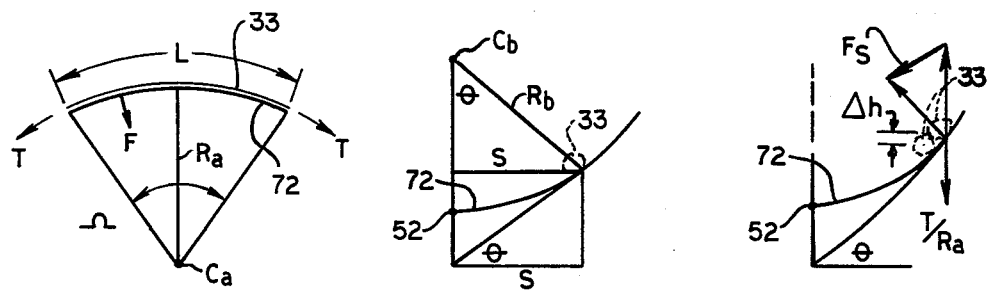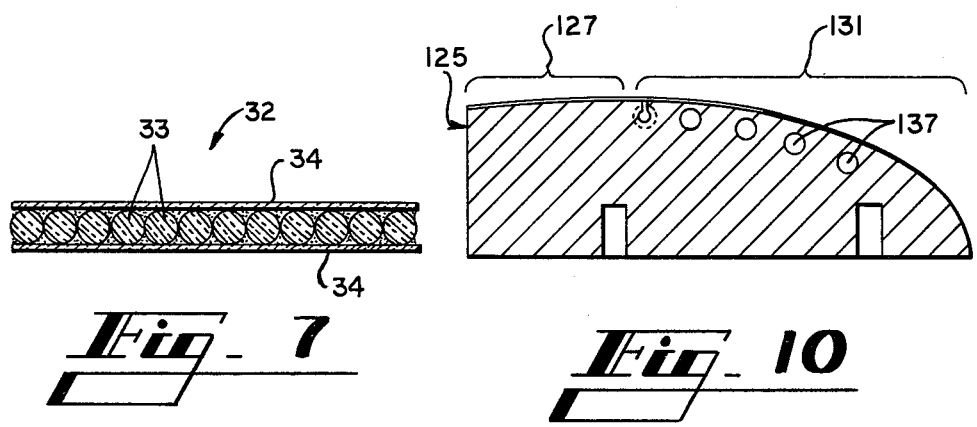

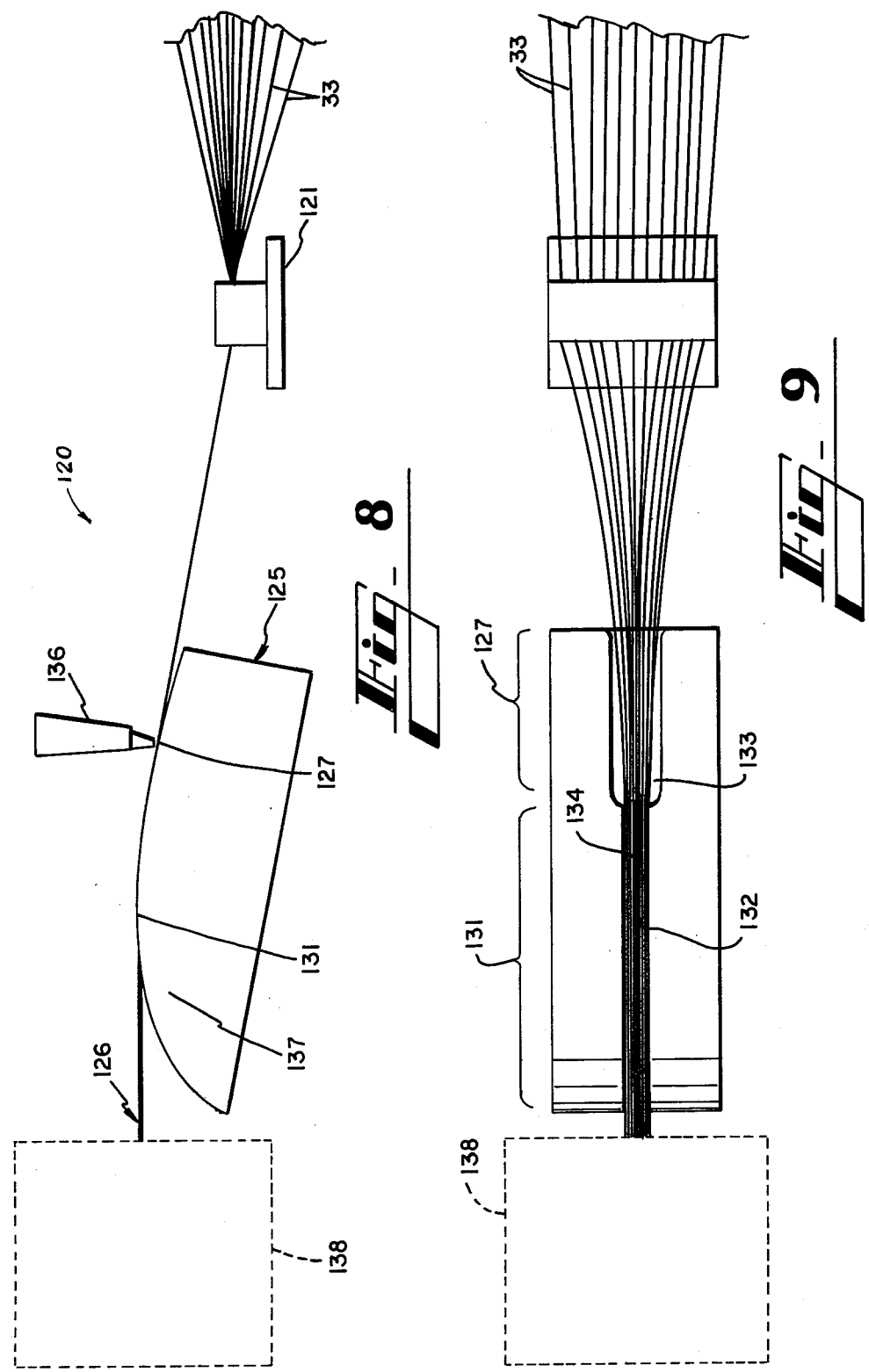

METHODS OF AND APPARATUS FOR ORGANIZING FIBER LIGHTGUIDES INTO A PLANAR ARRAY

TECHNICAL FIELD

This invention relates to methods of and apparatus for organizing fiber lightguides, and, more particularly, to methods of and apparatus for causing a plurality of fiber lightguides which are payed out from individual supply spools to be moved together in a reproducible manner in contiguous relationship to form a planar array.

BACKGROUND OF THE INVENTION

Optical communications are considered as potential replacements for electrical communications for the transmission of information and control signals from one point to another. One of the advantages of optical over conventional electrical communications is the broad band width capability which affords flexibility in the selection of a band width to be utilized in any given system. Cables used in optical communications systems are comprised of fiber lightguides which are small in physical size, light in weight and have a potentially low cost, but it is generally recognized that a prerequisite to the eventual acceptance of fiber lightguide cables is the development of reliable and simple fiber lightguide splicing arrangements.

Because of the small size of fiber lightguides, i.e. typically in the range of several micrometers to several hundreds of micrometers in diameter, it is generally considered preferable to be able to handle and splice them in groups or bundles, rather than on an individual basis. One kind of group is commonly referred to as a ribbon and includes two or more fiber lightguides which are held in contiguous, parallel relationship in a flat single layer or planar array. A plurality of ribbons are formed into a stack which is then jacketed, wrapped with strength members and enclosed with an outer jacket. The stacked ribbon structure, which is commonly referred to as a matrix in which the relative positions of the fiber lightguides are maintained throughout their length, greatly facilitates a splicing operation.

Although, it is desirable to be able to manufacture a ribbon in a single operation, problems have arisen in attempting to organize a relatively large number of the lightguides into a planar array without undue line tension and without the occurrence of crossovers.

Other concerns which are engaged in the production of fiber lightguide cables apparently have not addressed themselves to the foregoing problems of organizing a relatively large number of individual fiber lightguides. During ribbon manufacture, these concerns have advanced the fiber lightguides through individual tubes or guides which because of space limitations cannot be used to organize the relatively large number of fiber lightguides which are organized in accordance with the present invention.

Although concerns which make optical communications cables seemingly do not offer a solution to the problem of organizing a relatively large number of fiber lightguides, U.S. Pat. No. 3,130,453 teaches the organization of or change in width of a relatively large number of textile fibers into a small, tight or larger, looser bundle. It is also known to pass a band of fibers through a forming trumpet which rolls the band inwardly on itself from its outer edges to give it a cylindrical form, and to use rods located in vertical parallel planes to converge threads and form a ribbon with organizing forces which increase toward the center of the ribbon.

In order to organize fiber lightguides contiguously into a flat, single layer array, it is desirable that they be exposed to forces which are small enough to avoid damaging the lightguides, yet large enough to move them together. Nowhere in the known prior art are there shown methods or apparatus for organizing a plurality of fiber lightguides in a reproducible manner into a flat, single layer array in which the lightguides are in contiguous relationship with one another.

SUMMARY OF THE INVENTION

The foregoing problems of organizing fiber lightguides are solved by the methods and apparatus of this invention in which a plurality of lightguides are advanced over a surface having a curvature which is convex in the direction of advance and which is concave in a direction transverse to the direction of advance.

A plurality of fiber lightguides are organized contiguously in a reproducible manner into a planar array by advancing a plurality of fiber lightguides from individual supplies in a predetermined lateral ordering along separate, adjacent paths with the advance along at least portions of the paths being in the same direction, and then taking up the fiber lightguides. Between the supplies and apparatus for taking up the array, organizing forces are imparted to the fiber lightguides by line tension in cooperation with a surface over which the lightguides are advanced and which has convex and concave curvatures in the direction of advance and in a direction transverse thereto, respectively. The forces are effective to organize the fiber lightguides contiguously into a single layer array while maintaining the predetermined lateral ordering. The single layer of contiguously arrayed fiber lightguides is then guided past a surface having an infinite radius of curvature at least in a direction transverse to the direction of advance to form said single layer array into a planar array.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of a manufacturing apparatus in which a plurality of fiber lightguides are organized into a planar array and which are secured together to form a multi-lightguide ribbon;

FIG. 2 is an enlarged cross-sectional view of an optical communications cable which includes a stack of the ribbons which are manufactured by the apparatus in FIG. 1;

FIG. 3 is a simplified schematic view of a portion of the apparatus used in the line of FIG. 1 for organizing and securing together the plurality of fiber lightguides;

FIG. 4 is a detail view in elevation of an organizing surface having convex and concave curvatures for organizing the fiber lightguides;

FIG. 5 is a detail view in elevation of a surface which includes a portion having convex and concave curvatures and a portion having an infinite radius of curvature in at least one direction;

FIGS. 6A–6C are a sequence of views of force diagrams and surface geometrics which are used in the derivation of an equation governing the construction of an organizing surface;

FIG. 7 is an enlarged cross-sectional view of one of the ribbons shown in FIG. 2;

FIG. 8 is an enlarged schematic view in elevation of a portion of an alternate embodiment of the apparatus of FIG. 1;

FIG. 9 is a plan view of the alternate embodiment shown in FIG. 8; and

FIG. 10 is an elevation view in section of a portion of the apparatus shown in FIGS. 8 and 9.

DETAILED DESCRIPTION

Referring now to FIG. 1, there is shown an apparatus which is designated generally by the numeral 20 and which is made in accordance with the principles of this invention to produce a fiber lightguide ribbon 32 that is shown in FIG. 2. The ribbon 32 comprises a planar array of optical fiber lightguides 33—33 which are held in contiguous, parallel relation by a suitable flexible protective structure, such as, for example, laminating tapes 34—34. The planar geometry and the uniform center-to-center spacing of the fiber lightguides 33—33 advantageously facilitate array-splicing such as is shown for example in U.S. Pat. No. 4,029,390 issued June 14, 1977 in the names of E. L. Chinnock et al and U.S. Pat. No. 4,057,448 issued Nov. 8, 1977 in the name of C. M. Miller. Optical fiber connection technology is also reviewed in an article "A Review of Optical Fiber Connection Technology" authored by J. T. Dolglish which appeared in the Jan. 31, 1977 issue of *Telephony*.

As is seen in FIG. 2, an optical communications cable 30 comprises a core 31 having a plurality of the ribbons 32—32 arranged in a stack 36, which is twisted to provide strain relief when bent during installation, and enclosed with an inner jacket 37, a reinforced outer jacket 38, and intermediate strength members 39—39. This arrangement, which acts as a composite structure, is disclosed and claimed in U.S. Pat. No. 4,078,853 which issued Mar. 14, 1978 in the names of R. A. Kempf, M. R. Santana, and M. I. Schwartz.

The production of a ribbon 32 is accomplished by organizing a plurality of advancing fiber lightguides 33—33, which are payed out from individual supplies in a predetermined lateral ordering, into a flat single layer array 40 in which each fiber lightguide is in contiguous relationship to adjacent lightguides. This must be accomplished without inadvertent crossover of the fiber lightguides 33—33 in order to maintain their predetermined lateral ordering.

The apparatus 20 includes a fiber lightguide payout section, designated generally by the numeral 41, a ribbon assembly section, designated generally by the numeral 42, and a takeup, designated generally by the numeral 43.

The fiber lightguide payout section 41 includes a plurality of supply spools 51—51, each of which is rotatably mounted on a base 53 with a hysteresis brake (not shown) for applying suitable back tension to the fiber lightguides 33—33. The supply spools 51—51 which are divided into two groups $51a$–$51f$ and $51'a$–$51'f$ on opposite sides of a longitudinal centerline 52 are staggered to conserve space. Although the array 40 which is made with an apparatus 20 such as that shown in FIG. 1 typically includes twelve fiber lightguides 33—33, it should be understood that the principles of this invention could be used to organize an array that comprises more or less fiber lightguides.

As can be seen from FIG. 1, the payout section 41 also includes a plurality of guide sheaves 54—54' and 56—56' which are associated with the supply spools 51—51' and are designated with the same letter subscript as that of the associated spool. One of the sheaves 54—54' and one of the sheaves 56—56' which are associated with each payout position redirect the individual fiber lightguides 33—33 from the spools in a direction generally parallel to the centerline 52. The distances of the sheaves 53—53' and 56—56' from the longitudinal centerline 52 are increased gradually in order that the fiber lightguides 33—33 exit the payout section 41 in the predetermined lateral ordering and generally in a linear array, but spaced-apart.

At the exit end of the payout section 41, a sequencer, designated generally by the numeral 61, is used in order to maintain the fibers separated and in the desired lateral sequence. The sequencer 61 comprises a base 62 made of a ceramic material having a plurality of spaced teeth 63—63 upstanding therefrom. Each of the fiber lightguides 33—33 is advanced between a pair of adjacent teeth 63—63 which are made of a ceramic material to reduce frictional drag on the fiber lightguides. A hinged cover plate 64 which is preferably made from a rigid plastic material such as, for example, Plexiglas plastic, and which is faced with a layer of foam rubber on a surface 66 engages the tops of the teeth 63—63. The sequencer 61 is effective to maintain the fiber lightguides 33—33, which may be tacky from a prior drawing operation, spaced apart until their organization.

From the sequencer 61, the individual spaced fiber lightguides 33—33 are advanced through the organization section 42 which includes a plurality of organizers and a laminating apparatus 69. In the arrangement depicted in FIGS. 1 and 3, a first organizer 71 (see also FIG. 4) causes the fiber lightguides 33—33 to be moved laterally toward each other, but generally not contiguous to one another, to form an array 75. To accomplish the organization, which may be partial or total depending on line conditions, for example, the organizer 71 includes a specially formed surface 72. A second organizer 73, (see FIG. 3) which is similar in construction to the first organizer 71 and which has a surface 74 cooperates with the first organizer to cause the fiber lightguides 33—33 to be brought together contiguously into a single layer array 76 which has a generally arcuate configuration. The second organizer 73 is also effective to increase the tensile forces that are imparted to the lightguides 33—33 which comprise the array 76.

The surface 72, as well as the surface 74, over which the fiber lightguides 33—33 are advanced, has two general curvatures one of which occurs generally along the direction of advance of the fiber lightguides 33—33 and is considered to be positive. In this description, the curvature of a surface over which the lightguides 33—33 are moved is considered to be positive, if it is convex, i.e. if normals to the surface over which the lightguides are moved diverge outwardly from the surface. On the other hand, the curvature of the surface is considered to be negative if it is concave, that is if normals to the surface converge in an outward direction away from it.

In this description, the organizing surfaces may further be defined by saying that a curvature in a specified direction is negative if the lightguides 33—33 being advanced lie between the surface and its center of curvature, C, and positive if not. For example, in the longitudinal direction along the direction of advance of the lightguides 33—33, the surface 72 of the organizer 71 is positive and has a radius of curvature $R_a$ (see FIG. 6(A)) which extends from a center $C_a$. By the same convention, the curvature of the surface 74 of the organizer 73 in the direction of lightguide advance is convex and is positive. Viewing now FIG. 6(B), the surface 72 of the organizer 71 is formed with a concave curvature which is transverse to the direction of advance of the lightguides 33—33 and which has a radius of curvature $R_b$ that extends from a center $C_b$. Since the lightguides 33—33 are being advanced between the surface 72 and the center $C_b$, the curvature of the surface in accordance with the foregoing convention is negative in the direction transverse to the movement of the lightguides. Similarly, the curvature of the surface 74 in the direction transverse to the direction of advance of the lightguides 33—33 is concave and negative.

The array 76 of fiber lightguides 33—33 is then passed over a third organizer 81 (see FIGS. 3 and 5) which comprises a first section 82 and a second section 83. The first section 82 comprises a surface 84 which like the surfaces 72 and 74 has a convex and a concave curvature and which is effective to complete the organization of the fiber lightguides 33—33, if necessary, into a single layer having a generally arcuate configuration in which the lightguides are arrayed contiguously.

The second section 83 of the third organizer 81 includes a surface 86 which has zero curvature in at least a direction transverse to the centerline 52. The surface 86 is effective to cause the array 76 that is received from the first section to be reformed from an arcuate to the flat or planar configuration 40 to facilitate the subsequent splicing of its fiber lightguides 33—33 with those in other stacks 36—36. While not necessary for the organization of the lightguides 33—33 into a flat single layer array, the surface 86 may also be constructed with zero curvature in the direction of advance of the lightguides.

The configuration of each of the organizing surfaces 72, 74 or 84 must be such that each of two seemingly inconsistent objectives is satisfied. The fiber lightguides 33—33 must be arrayed contiguously in a single layer and there must be reliability of operation with no crossovers of fiber lightguides caused by excessive elevation differences. To achieve the former objective, forces which are imparted to the lightguides 33—33 as they are moved past each organizing surface must be sufficiently large to cause them to be moved together but not so large that they cause crossovers and disturb the lateral ordering.

In the derivation of an equation for the configuration of the surface 72, 74 or 84 over which the fiber lightguides 33—33 are advanced, it is assumed that each surface has a convex or positive curvature $K_a$ and a radius of curvature $R_a$ in the direction of advance, where $K_a = 1/R_a$. As a result of the line tension, each of the fiber lightguides 33—33 is subjected to a force per unit length which causes it to be pressed into conforming engagement with the surface 72. As can be seen from FIG. 6A, $\Omega$ is the angle subtended by the contact length L of the surface 72, for example, and is also the angular change in the direction of a fiber lightguide which is caused between the points at which it enters and exits that surface. The force per unit length which is exerted on the fiber lightguide as it is advanced over and in engagement with a length L of the surface 72, 74 or 84 is $T/R_a$. Each of the surfaces 72, 74 and 84 also has a concave or negative curvature $K_b$ and a radius of curvature $R_b$ in a direction transverse to the direction of advance where $K_b = 1/R_b$. Viewing now FIGS. 6(B) and 6(C), an organizing force, $F_s$, which is exerted on each unit length, 1, of each fiber lightguide 33 a distance S from the centerline 52 to cause it to be moved toward the centerline in parallel contiguous relation with adjacent fiber lightguides, is equal to $F \sin \theta$ or $(T/R_a) \sin \theta$. But since $\sin \theta = S/R_b$, the converging or organizing force per unit length, $F_s$, increases proportionally with distance S from the centerline 52 and is equal to the magnitude of $TS/R_a R_b$.

This last mentioned equation is useful in developing the geometry of the surfaces 72, 74 or 84 which organize the plurality of fiber lightguides 33—33. $R_a$, which is the radius of curvature in the direction of advance of the fiber lightguides 33—33, is limited by a value such that undue bending stresses are not imparted to the fiber lightguides 33—33. $R_b$, which is the radius of curvature in a direction generally perpendicular to the direction of advance of the fiber lightguides 33—33, must be chosen so that the difference $\Delta h$ (see FIG. 6(C)) in elevation of the centers of adjacent fiber lightguides 33—33 is less than one-half the diameter of a fiber lightguide.

As can be seen from the foregoing equations, the line tension, T, which typically is on the order of 300–350 grams, affects the force per unit length on the fiber lightguides 33—33. Back tension at the supply spools 51—51 affects the tension throughout the entire apparatus 20 and is the most significant factor up to the organizers since any guides offer very little frictional drag. Back tension may be controlled by the choice of lubricant viscosity for the payout spool axle or by a more sophisticated arrangement which is not speed-dependent such as, for example, clutches (not shown).

The ribbon manufacturing apparatus 20 as shown in FIG. 1 is modular in concept and is easily changed to permit the use of different assembly techniques for the organized array 40 of fiber lightguides 33—33. Presently used fiber lightguide structures, each described by a separate acronym which is indicative of a joining technique, include adhesive sandwich ribbons (ASR), heat-welded ribbons (HWR), epoxy-UV bonded ribbons (UVBR) and hot melt ribbons (HMR). Although these techniques are presently used to bond together twelve fiber lightguides, a ribbon having more or less lightguides may be easily formed.

Referring once again to FIG. 3, it is seen that the flat single layer array 40 of fiber lightguides 33—33 is advanced into a laminating apparatus, designated generally by the numeral 69, for forming an adhesive sandwich ribbon (ASR). The laminating apparatus 69 includes top and bottom sets of guide rolls 102—102, respectively for guiding the two adhesively backed tapes 34—34 into engagement with the array 40 of fiber lightguides 33—33 being advanced therebetween. The tapes 34—34 with the array 40 therebetween are formed into a bonded laminate, i.e. the ribbon 32, by a set of laminating rolls 106—106 in which the top roll 106 is controlled to apply more or less pressure to the laminate.

From the laminating rolls 106—106, the laminate which comprises the array 40 held between overlying and underlying tapes 34—34, respectively, is slit, if necessary, to obtain a ribbon 32 (see FIG. 7) having the desired final width, e.g. 0.140". Subsequently, the ribbon 32 is passed through an optical projection system (not shown), which is used to observe the ribbon orientation during its fabrication, and then through a printer apparatus (not shown) by a tractor belt capstan 110. The capstan loading is provided pneumatically so that it adds to or subtracts from the line tension to maintain the tension within a desired range, which as mentioned before is on the order of 300-350 grams. From the capstan 110, the ribbon 32 is moved to the takeup 43.

Referring now to FIGS. 8–10, there is shown an alternate embodiment 120 of the apparatus 20 for organizing and for bonding together a plurality of the fiber lightguides 33—33. The apparatus 120 includes a sequencer 121 which gathers the fiber lightguides which are being advanced along different levels, i.e. in an XYZ arrangement, into an X-Y plane but spaced apart.

The fiber lightguides 33—33 are then advanced into engagement with a device 125 which organizes and bonds them together in the form of a ribbon 126. The ribbon 126 differs from the ribbon 32 by the manner in which the fiber lightguides 33—33 are secured together.

The device 125 includes an entrance portion 127 which like the organizers 71, 73 and 81 in the apparatus 20 is made convex with a positive curvature in the direction of advance and with a negative curvature in a direction transverse thereto. The device 125 further includes a portion 131 which includes a guideway 132 generally rectangular in cross-section with a bottom surface having an infinite radius of curvature in a direction transverse to the fiber lightguides 33—33. This causes the fiber lightguides 33—33 which have been organized into a contiguous single layer array 133 to undergo a transition to a flat single layer array 134 when passed over the portion 131.

At the transition from the entrance portion 127 to the portion 131 of the device 125, an applicator 136 applies a coating of a solvent or a hot melt adhesive to the array 133. The device 125 also includes heating means 137 (see FIG. 10) which causes the coating to be softened to cause the fiber lightguides 33—33 to adhere together. When coating the array 133 with solvent or hot melt adhesive, it is important that the applicator 136 be positioned at the transition of surfaces so that the cure thereof occurs in the portion 131 which includes the heating means 137. Otherwise the adhesive may cure in the portion 27 and set the array 133 in an arcuate configuration which could cause micro-bending losses in the cable. It is most desirable to achieve a flat array wherein the lightguides 32—32 will be in a relaxed position.

When the array 133 is coated with an epoxy material, the applicator 136 may be located anywhere along the length of the device 125 in alignment with the lightguides 33—33. This is permissible since the apparatus 20 will then include a device 138 which is positioned downstream of the device 125 and which is effective to cure the epoxy coating.

After the fiber lightguides 33—33 have been organized into a linear array, anyone of the above techniques may be used to bond them together so that the geometry of the array is maintained. Moreover, during the drawing of the fiber lightguides 33—33 from a preform (not shown), they are coated with a protective material which typically is ethylene vinyl acetate (EVA). The advance of the array 133 over the heated surface 132 will cause a reaction of the EVA and cause the fiber lightguides 33—33 to be adhered together.

EXAMPLE 1

In an apparatus 20 which was constructed in accordance with this invention, the sequencer 61 was constructed to include a base about 7 cm long with a plurality of teeth about 1.3 cm in height and having a spacing of 0.32 cm between opposed surfaces of adjacent teeth. The first organizer 71 was positioned about 43 cm downstream of the sequencer with the second inverted organizer 73 being about 11.5 cm from the first. The device 81 was spaced about another 11.5 cm downstream of the second organizer. Each of the first and second organizers 71 and 73 included a block made of 1020 steel about 6 cm long by about 5 cm wide with a chrome-plated surface formed thereon being convex in the direction of lightguide advance and having a radius of curvature $R_a$ of about 16.5 cm and concave in a transverse direction with a radius of curvature $R_b$ of about 1 cm. The device 81 included the first portion 82 having a radius of curvature $R_a$ of about 23 cm and a radius of curvature $R_b$ of about 1 cm and extending along the axis 52 for a distance of about 3.8 cm. The second portion 83 had a length of about 2.5 cm and had a guideway about 0.13 cm deep, and about 0.3 cm wide. It was found that the apparatus 20 as described in this example could be used to organize twelve fiber lightguides 33—33 into a ribbon 32 at a line speed of about 60 meters per minute.

EXAMPLE 2

An organizing and bonding device 125 made in accordance with this invention was used to weld coated fiber lightguides 33—33 together. The surface 127 had a curvature $R_a$ of about 270 mm, a negative curvature of about 9.5 mm, a length of about 150 mm and an angle $\Omega$ of about 9°. The fiber lightguides 33—33 prior to organization had been coated with a copolymer of ethylene and vinyl acetate which is available from DuPont under the designation Alathon 3172. Just prior to the fiber lightguides 33—33 being advanced to the bonding portion 131, they were contacted with a solvent such as, for example, 1, 1, 1-trichlorethane. The surface of the bonding portion 131 which was made of polished brass was maintained at 70° C. and bonding of the array was successful at line speeds up to 300 mm per second.

EXAMPLE 3

The same coating material was used as that in Example 2 as well as the same $R_a$, $R_b$, L and $\Omega$. However, in Example 3, the bonding portion 131 was coated with Teflon plastic which was maintained at 240° C. and no solvent was used. The array was bonded together at line speeds up to 600 mm per second. A brass surface was not used since it had been found to abrade the coating material which at these temperatures became soft and tacky. The use of a smooth Teflon plastic overlay resulted in significant reduction in friction and abrasion.

It is to be understood that the above-described arrangements are simply illustrative of the invention. Other arrangements may be devised by those skilled in the art which will embody the principles of the invention and fall within the spirit and scope thereof.

What is claimed is:

1. Apparatus for organizing a plurality of fiber lightguides in a reproducible manner into a planar array, which comprises:
    means for advancing including payout means a plurality of fiber lightguides along separate, adjacent paths with the advance along at least portions of the paths being in the same direction and with their longitudinal axes generally in a single plane;
    means for taking up the plurality of fiber lightguides; and means interposed between the payout means and the taking up means for converging the fiber lightguides that are being advanced and for organizing them continguously into a planar array having a predetermined lateral ordering, said converging and organizing means including a first surface having a length which extends along said paths of travel and which has a curvature that is convex in the direction of advance and a curvature that is concave in another direction transverse to the direction of advance, said first surface being effective to apply forces to the fiber lightguides being advanced therealong to converge and organize the fiber lightguides into contiguous parallel relation in a single layer array in which the lightguides have said predetermined lateral ordering, said converging and organizing means also including a second surface having an infinite radius of curvature at least in a direction transverse to the direction of advance and being adapted to receive said single layer of fiber lightguides in contiguous parallel relation and to reform the single layer into a planar array.

2. The device of claim 1, wherein the first surface is formed in accordance with the following equation $$F_s = TS/R_a R_b$$

where
T = tension in a fiber lightguide;
S = distance from a longitudinal centerline of the first surface to the lightguide;
$F_s$ = an organizing force imparted to a fiber lightguide at a distance S from the longitudinal centerline;
$R_a$ = radius of convex curvature which is not less than a predetermined value to avoid imparting undue bending stresses to the lightguide; and
$R_b$ = radius of concave curvature which is such that the difference in elevation of the centers of contiguous fiber lightguides is less than half the diameter of a fiber lightguide.

3. The apparatus of claim 1, which also includes a plurality of fiber lightguide supplies and wherein the means for converging and for organizing includes in order from said supplies to the means for taking up the fiber lightguides a first surface having convex and concave curvatures with the center for the convex curvature being below the first surface, a second surface having convex and concave curvatures with the center for the convex curvature being above the second surface, and a third surface having convex and concave curvatures with the center for the convex curvature being below the third surface.

4. The apparatus of claim 3, wherein the third surface also includes a portion having an infinite radius of curvature at least in a direction transverse to the direction of advance of the fiber lightguides to cause the single layer of contiguous fiber lightguides to be reformed into a planar array.

5. The apparatus of claim 1, which also includes a plurality of fiber lightguide supplies and a sequencer interposed between the converging means and the supplies for maintaining the plurality of lightguides spaced apart in the predetermined lateral ordering in an x-y plane.

6. The apparatus of claim 1, which also includes means interposed between the converging and organizing means and the taking up means for laminating the fiber lightguides between two longitudinal tapes to form a ribbon which comprises a planar array of contiguous fiber lightguides.

7. The apparatus of claim 1, which also includes means positioned along the converging and organizing means for applying a coating to the lightguides to cause the lightguides to be bonded together.

8. The apparatus of claim 7, wherein the portion on the third surface having the convex and the concave curvatures is connected to the second surface through a transition, and the means for applying the coating is positioned at the transition.

9. A method of organizing a plurality of fiber lightguides in a reproducible manner into a planar array, which comprises the steps of:
advancing a plurality of fiber lightguides along separate, adjacent paths with the advance along at least portions of the paths being in the same direction and with their longitudinal axes generally in a single plane;
causing the fiber lightguides that are being advanced to be arrayed into a single layer in which they are arrayed contiguously in the predetermined lateral ordering by guiding the fiber lightguides into engagement with and along a first surface having a length which extends along said paths, which is generally convex in the direction of advance, and which is generally concave in another direction transverse to the direction of advance; and
causing the single layer contiguous array of fiber lightguides to be guided into engagement with and past a second surface having an infinite radius of curvature at least in a direction transverse to their direction of advance to reform the single layer of contiguous fiber lightguides into a planar array of contiguous fiber lightguides.

10. The method of claim 9, wherein the step of arraying the fiber lightguides into a single layer is accomplished by guiding them successively past a first surface, a second surface and a first section of a third surface, each of said first and second surfaces and said first section of the third surface having a curvature which is convex in the direction of advance of the fiber lightguides and a curvature which is concave in a direction transverse thereto.

* * * * *

UNITED STATES PATENT AND TRADEMARK OFFICE
CERTIFICATE OF CORRECTION

PATENT NO. : 4,289,558
DATED : September 15, 1981
INVENTOR(S) : Bernard R. Eichenbaum and Francis J. Topolski It is certified that error appears in the above—identified patent and that said Letters Patent is hereby corrected as shown below:

Col. 8, line 62 after "means" (first occurrence) insert ---including payout means--- after "advancing" delete "including payout means---

Col. 9, line 4 change "continguously" to ---contiguously--- line 24 change "device" to ---apparatus---

Col. 10, line 19 change "on" to ---of--- line 34 change "the" to ---a---.

Signed and Sealed this

Ninth Day of February 1982

[SEAL]

Attest:

GERALD J. MOSSINGHOFF

Attesting Officer      Commissioner of Patents and Trademarks